March 21, 1950     B. E. RUTHERFORD     2,501,235
OIL DRAIN FOR BEARINGS
Filed Dec. 13, 1946
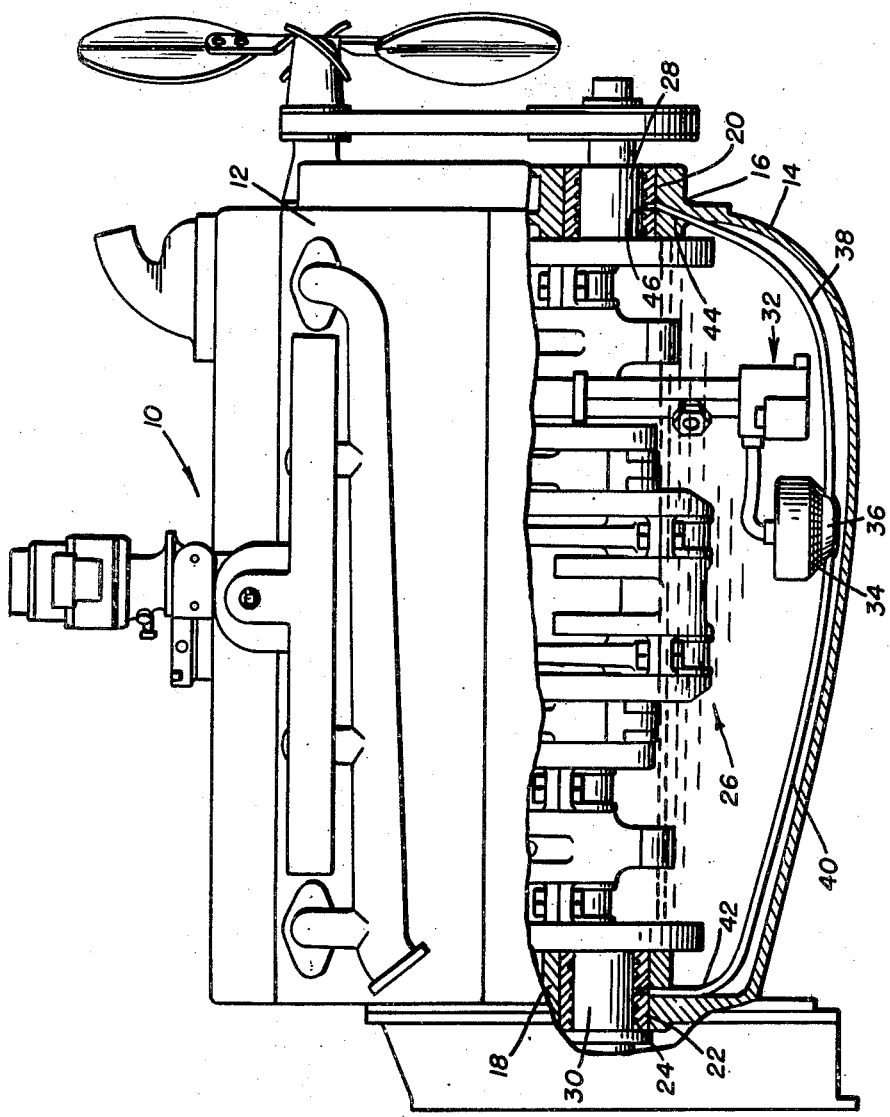
Inventor
Bernard E. Rutherford
By *Clarence A. O'Brien and Harvey B. Jacobson*
Attorneys Patented Mar. 21, 1950

2,501,235

UNITED STATES PATENT OFFICE 2,501,235

OIL DRAIN FOR BEARINGS

Bernard E. Rutherford, Perrysville, Ohio

Application December 13, 1946, Serial No. 716,008

2 Claims. (Cl. 184—6)

This invention relates generally to oil drains for bearings, and more particularly to the combination with an oil pump and fixed or main bearings in an engine having pressure lubrication, of a tube communicating the intake of said pump with said bearings, whereby excess oil is drawn from these bearings.

An object of this invention is to provide means whereby excess oil can be drawn from the main bearings of an engine, thus preventing this excess oil from being thrown out onto the clutch plate, or more generally, from being thrown out from the outer ends of the main bearings of the engine.

Another object of this invention is to provide means whereby crankcase pressure can be prevented from lessening the flow of oil from the ends or drain pipe of the bearings.

Another object of this invention is to provide a device of this character which can be applied to any one or all of the fixed bearing in engines having forced or pressure lubrication.

And a last object to be specifically mentioned is to provide a vacuum drain system for bearings which is inexpensive and practicable to manufacture, simple to install in an engine, and which is progressively more effective as the bearings become worn, the device being so engineered and designed as to provide for efficient and durable service.

With these and other objects in view as will appear hereinafter, this invention resides in certain novel features of construction, combination and arrangement of parts as will hereinafter be described in detail and particularly set forth in the appended claims, reference being had to the accompanying drawing which forms a material part of this application and in which one embodiment of this invention is illustrated.

The single figure is a side elevational view of an engine, with a portion of the crankcase and contiguous portions of the bearings broken away and the underlying parts shown in section, the unbroken portions including a crankshaft and the oil pump and the subject matter of this present invention being shown in elevation and in operative position.

The same characters of reference designate the same or similar parts throughout the specification and the drawing.

Referring now to the drawings in detail, an engine generally indicated by the numeral 10, and including a block 12, a crankcase 14 which may be thought of as including an oil pan, a front bearing support 16 and a rear bearing support 18, is represented with other standard complementary parts.

Bearings 20 and 22 are seated in the bearing supports 16 and 18, and these bearings may be of conventional design and equipped with annular or diagonally disposed oil grooves represented at 24. Piston rods and a crankshaft generally indicated by the numeral 26, supported on a front journal 28 and a rear journal 30, and an oil pump generally indicated by the numeral 32 completes the structure with which the present invention is directly and operatively associated.

A screen 34 on the intake end of the oil pump 32, has secured thereto a cap 36 covering a considerable portion of the screen 34, and by reason of its position at the mouth of the intake is under suction or negative pressure when the engine and the pump are operating. Two tubes 38 and 40 are secured terminally to this cap 36, communicating with the interior of the cap, and leading forwardly and rearwardly to the bearings 20 and 22. The method of securing these tubes to the bearings is a matter of mechanical expediency, the tubes being simply connected terminally to the standard bearing drain tubes in constructions where these exist; in other cases the bearing seats 16 and 18 may be drilled to allow the insertion of the outer ends of the tubes 38 and 40, as at 42 and 44. In some cases the bearings will have to be apertured as at 46, these apertures being made to register with the ends 42 and 44 of the said tubes.

In the light of the foregoing description of the mechanical details of this invention, the method of operation will be obvious, this operation being completely automatic. It will be clear that more oil will be transferred from the bearings when these bearings are worn, and the device is therefore progressively more effective as the need for the device is increased. Furthermore, it will now be evident that crankcase pressure, even when excessive, will not operate to defeat the effectiveness of this device.

Though there has been shown a particular embodiment of this invention, this application is not limited to this particular embodiment, but it is desired to include in the scope of this invention the construction, combination and arrangement of parts substantially as set forth in the appended claims.

Having thus described this invention, what is claimed as new and desired to be secured by Letters Patent is:

1. In combination with an oil pump and a bearing in an engine having pressure lubrication, a pipe operatively connecting the pump and bearing, a screen on the intake of said pump, a cap covering a portion of said screen, and a tube leading directly from a low pressure zone on the inside of said cap to said bearing, whereby excess oil is drawn from said bearing.

2. In combination with an oil pump and a bearing having an oil drain pipe in an engine having pressure lubrication, a pipe operatively connecting the pump and bearing, a screen on the intake of said pump, a cap covering a portion of said screen, and a tube leading directly from a low pressure zone on the inside of said cap to said oil drain pipe, whereby excess oil is drawn from said bearing.

BERNARD E. RUTHERFORD.

REFERENCES CITED

The following references are of record in the file of this patent:

UNITED STATES PATENTS

| Number | Name | Date |
| --- | --- | --- |
| 817,629 | Belleville | Apr. 10, 1906 |
| 1,055,558 | Renault | Mar. 11, 1913 |
| 2,155,218 | Cain | Apr. 18, 1939 |
| 2,402,467 | Thompson | June 18, 1946 |